Sidney Weicher
Albert Einbinder
INVENTORS.

BY  Karl F. Ross

AGENT.

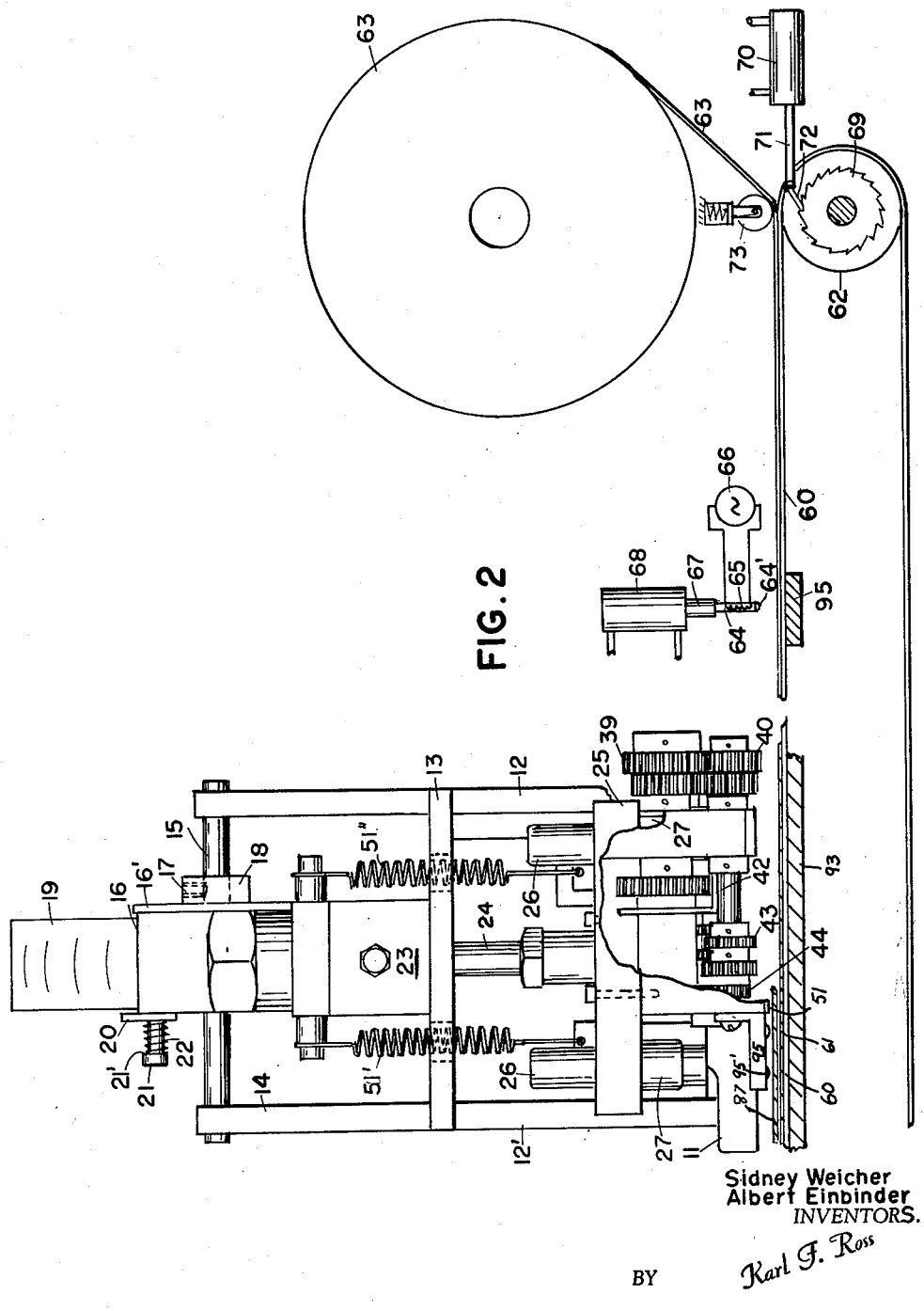

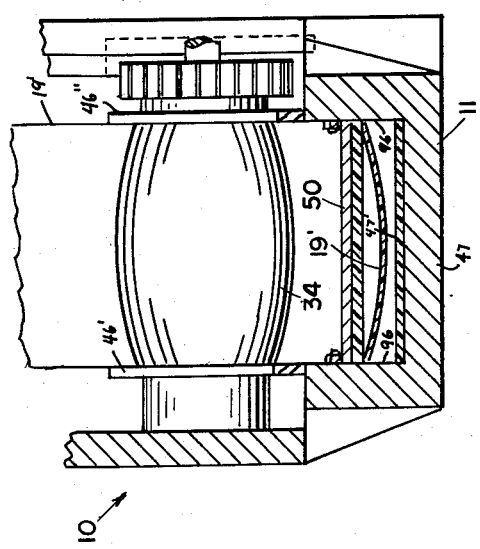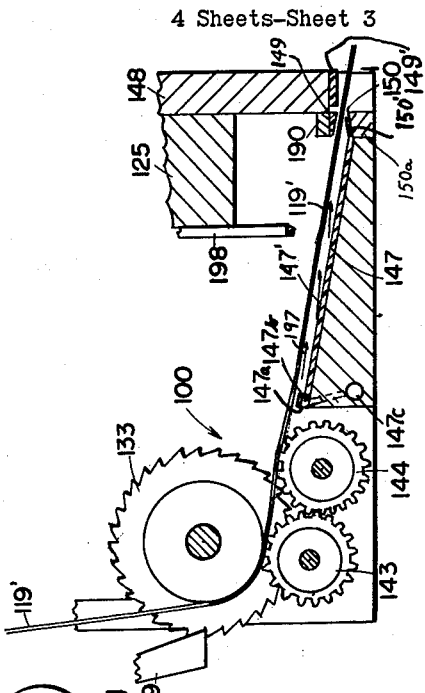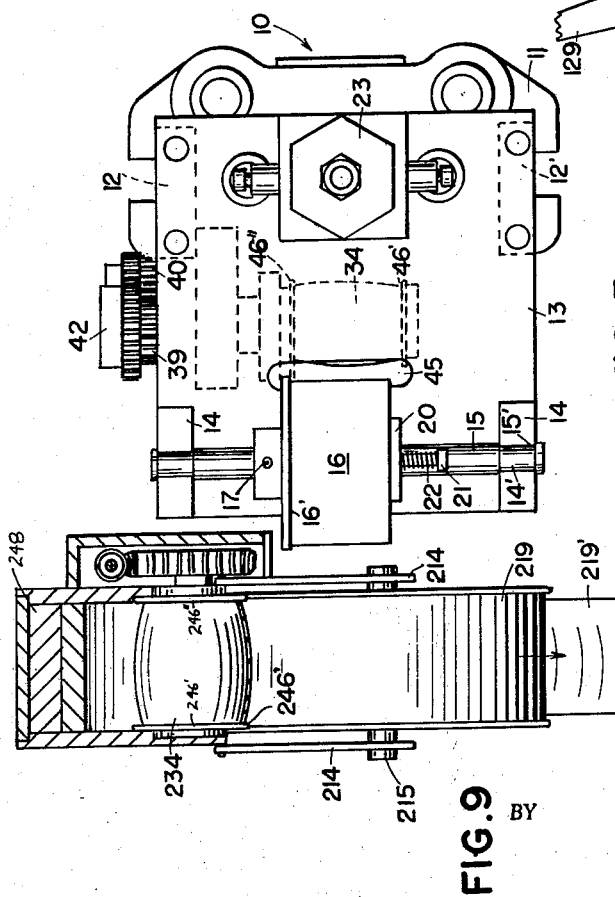

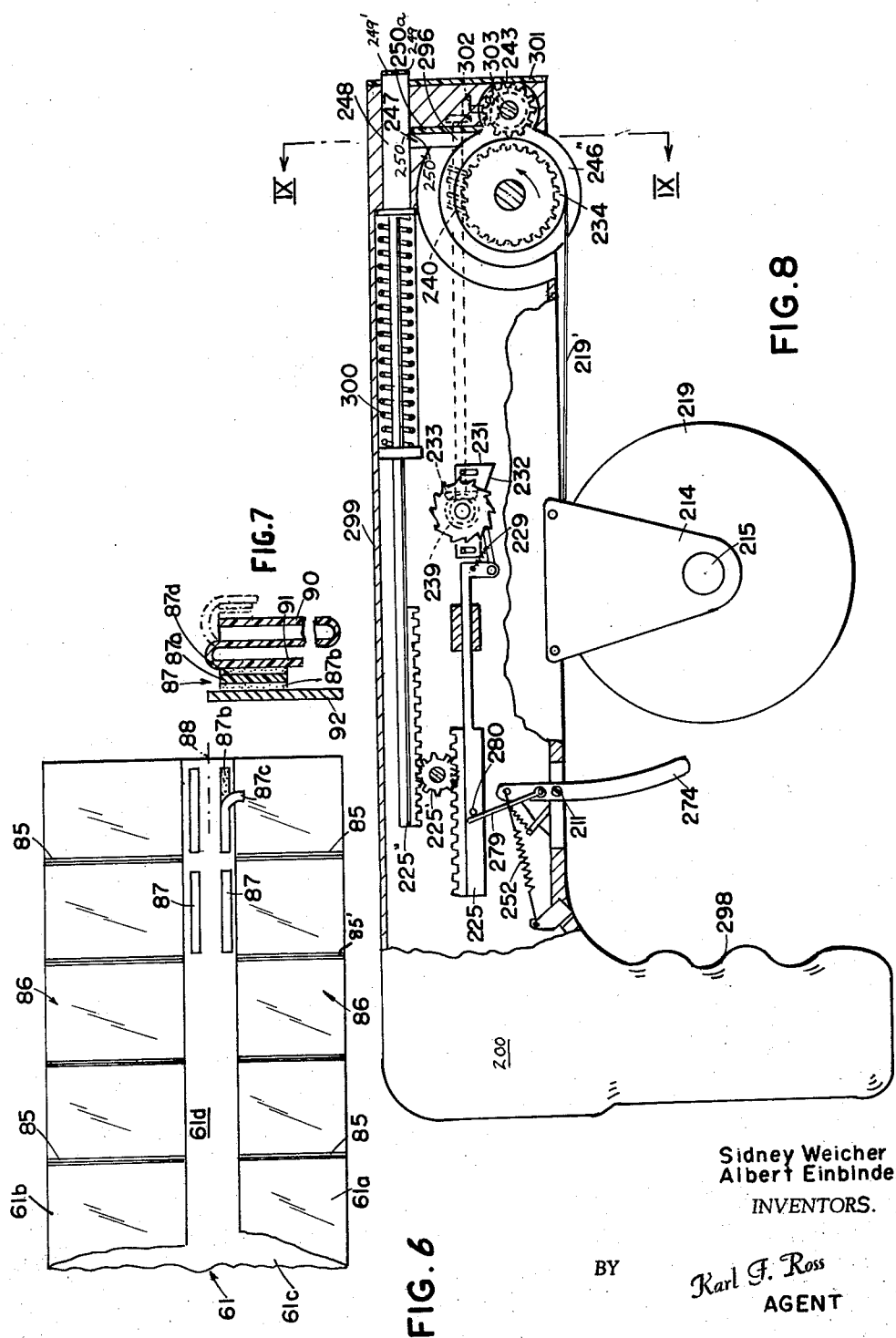

3,125,006
ADHESIVE-STRIP-APPLYING APPARATUS
Sidney Weicher, New Rochelle, and Albert Einbinder, Brooklyn, N.Y., assignors to Inland Paper Products Corp., Brooklyn, N.Y., a corporation of New York
Filed Feb. 6, 1962, Ser. No. 171,411
10 Claims. (Cl. 93—1)

Our present invention relates to apparatus for applying adhesive-tape strips to objects such as bags and the like and to apparatus for automatically manufacturing containers provided with an adhesive strip.

Heretofore, containers such as polyethylene, cellophane and paper bags have been provided with strips of pressure-sensitive adhesive designed to effect a closure of the container or to permit the container to be secured to a support, by hand or with the aid of manually operated tape dispensers adapted to dispense strips of adhesive tape which were applied manually to the desired substrate.

It is an object of the present invention to provide an apparatus for dispensing strips of gummed or pressure-sensitive tape and for applying the strips simultaneously to a substrate.

Another object of the invention is to provide apparatus for automatically manufacturing containers or the like having a strip of pressure-sensitive tape provided for effecting closure.

A more particular object of our invention is to provide a strip-dispensing apparatus adapted automatically to sever transversely a tape provided with a pressure sensitive adhesive, thereby forming strips thereof.

The foregoing objects have been realized, according to the invention, in an apparatus wherein tape having a gummed or pressure-sensitive adhesive layer on a flexible base is drawn from a roll and fed intermittently past a cutter extending transversely of the tape. Means are provided for imparting a transverse curvature to the portion of the tape fed to the cutter for stiffening the tape and preventing its adhesive surface from sticking to the cutting edge. We have found that, as a consequence of the transverse curvature of the tape, the latter upon shearing springs off the cutting edge in spite of the fact that one normally would expect the adhesive surface of the tape to cling thereto. This springback action may be enhanced if a material such as polytetrafluoroethylene, to which pressure-sensitive adhesives do not generally adhere, is disposed adjacent the cutting edge or forms a part thereof.

Advantageously the tape is drawn from a supply roll over a deflecting roller by means of an intermittently stepped toothed wheel engaging the adhesive surface of the tape only to a limited extent, the wheel having a low-adhesion (e.g. polytetrafluoroethylene) contact surface.

According to another feature of this invention, the feed wheel is stepped by a pawl engaging a ratchet which is coupled with the feed roller, the pawl being cammed out of engagement with the ratchet after a predetermined stroke.

According to a further aspect of the instant invention, the adhesive tape advanced by the feed means may be suspended upon an air cushion which carries the tape to the cutting edge without, however, permitting it to stick to parts of the apparatus. Advantageously, means may be provided for withdrawing the adhesive surface of the tape from engagement with the cutting edge subsequently to the serving of a transverse strip from the tape.

While the aforedescribed apparatus may comprise a manually operable portable device for applying adhesive strips to any suitable substrate, we have found that such apparatus may be employed to considerable advantage in conjunction with conveyor means for advancing a substrate past the strip-dispensing device whose cutter member is formed as a plunger having a generally flat surface in area contact with the strip for pressing it, upon its detachment from the tape, against the substrate. The conveyor may be advanced intermittently, in which case application of the adhesive strip to the substrate is effected between successive displacements of the substrate, or continuously, in which case we provide means for maintaining pressure upon the strip and firmly urging it against the substrate as the latter is entrained past the cutter of the strip-dispensing device.

The above and other objects, features and advantages of our invention will become more readily apparent from the following description, reference being made to the accompanying drawing in which:

FIG. 2 is front-elevational view, partly broken away, of the apparatus;

FIG. 3 is a top-plan view of a strip dispenser constituting part of the apparatus of FIGS. 1 and 2;

FIG. 4 is a cross-sectional view taken along line IV—IV of FIG. 1;

FIG. 5 is a lateral cross-sectional view taken in the same direction as the view of FIG. 1 but of a strip-dispensing device according to another embodiment of the invention;

FIG. 6 is a plan view showing somewhat diagrammatically successive steps in the formation of a bag by the apparatus of FIGS. 1–4;

FIG. 7 is a longitudinal cross-sectional view of one of the bags;

FIG. 8 is a side-elevational view, partly in section, of a portable, manually operable strip-dispensing device according to the invention; and FIG. 9 is a cross-sectional view taken along line IX—IX of FIG. 8.

Figure 1:
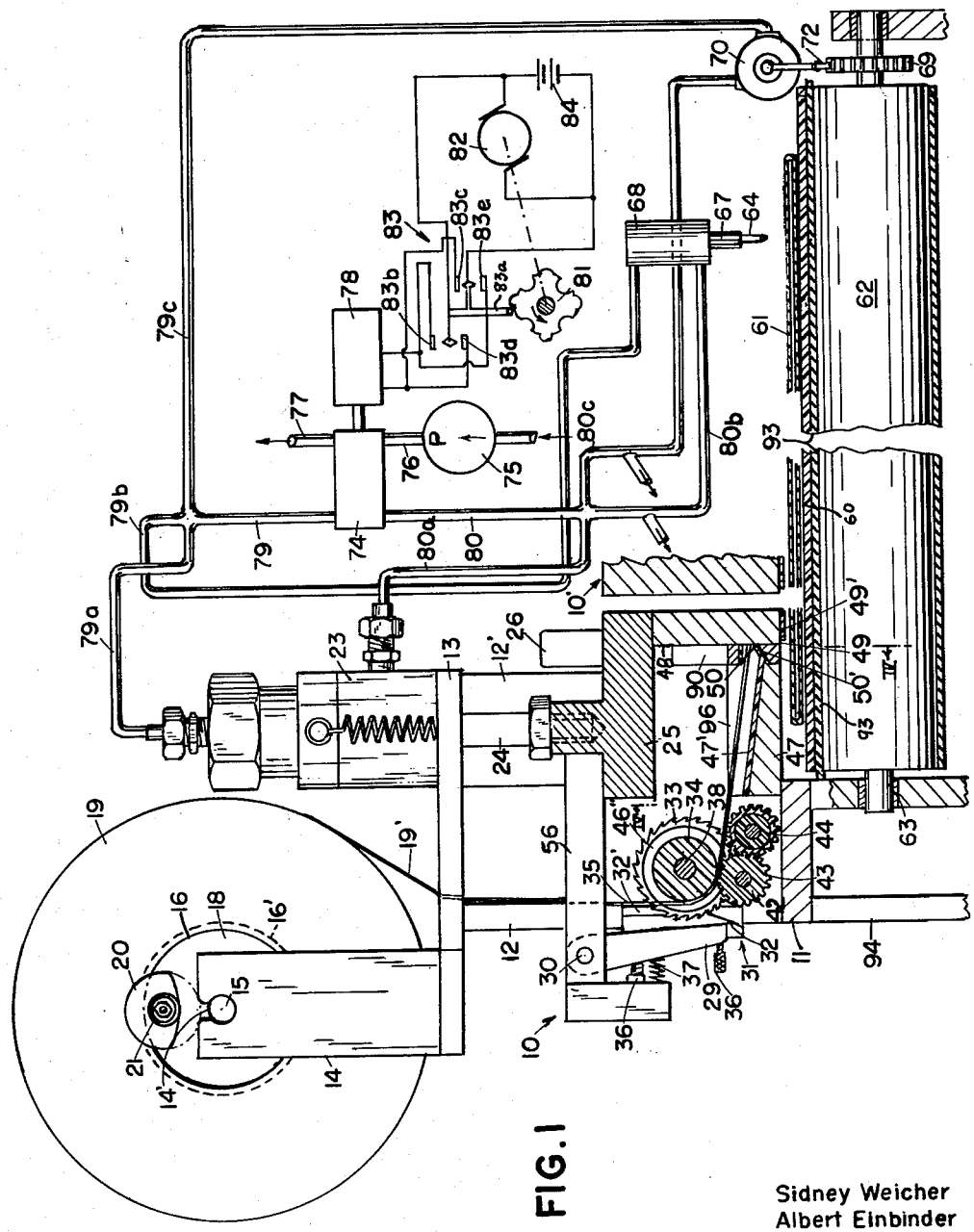
FIG. 1 is a side-elevational view, partly broken away, of an adhesive-strip-applying apparatus according to the invention.

In FIGS. 1–4 of the drawing we show a strip-dispensing device 10 comprising a base 11 which carries uprights 12, 12'. The latter bear a transverse plate 13 whose upstanding arms 14 rotatably support a shaft 15 to which is fixed a tape-roll-supporting drum 16 by means of a setscrew 17 passing through the hub 18 of the drum. The roll 19 of adhesive tape (shown in FIG. 1) may be slipped onto the drum 16 and laterally abuts a shoulder 16' while being urged thereagainst by an eccentric locking plate 20. Plate 20 is swingable around its pin 21 from its unlocked position (shown by dot-dash lines in FIG. 1) in which it is cleared by the tape roll 19 as it is axially slid onto the drum 16. In the locked or solid-line position of the plate 20, a coil spring 22 surrounding the pin 21 bears upon a shoulder 21' of the latter and the plate 20 to urge it against the tape roll 19. Arms 14 are slotted at 14' to receive the necks 15' of shaft 15, thereby enabling removal of this shaft to permit replacement of the rolls 19.

Support plate 13 also carries a pneumatic cylinder 23 whose piston 24 is vertically reciprocable and is secured to a cutting head 25, which is similarly displaceable upon upright guide bars 26. The head 25 is provided with a pair of bushings 27 which slidably engage the bars 26. A connecting rod 56 (FIG. 1) is secured to the head 25 and carries a pawl 29 pivoted thereto at 30. The pawl 29 co-operates with a cam 31 whose ramp 32 deflects pawl 29 away from a ratchet wheel 33 which is secured to a feed roller 34. Cam 31 is mounted upon the upright 12 and is provided with a guide surface 32', positioned ahead of the ramp 32, which permits the pawl to engage the ratchet 33 during an initial portion of the downward stroke of the head 25. Cam 31 is received in a recess 35, formed in upright 12, and is transversely displaceable therein by adjusting screws 36 for preselecting the point during the stroke of head 25 at which pawl 29 is cammed out of engagement with the ratchet 33. It will be apparent that this mechanism enables accurate regulation of the width of the strip dispensed by the device 10. A spring 37 biases the pawl 29 against ratchet 33.

The feed roller 34 is keyed to a shaft 38 whose pinion 39 (FIG. 3) meshes with the gear 40 of a feeding-wheel shaft 41. The latter is connected via a transmission (not shown) to the shaft 42 whose toothed wheels 43 engage the tape 19' fed from roll 19 around the roller 34. A plurality of toothed wheels 44, interleaved with the wheels 43, provide additional support for the portion of tape advanced past the roller 34. The latter and the toothed portions of wheels 43 and 44 are preferably of low-adhesion material such as polytetrafluoroethylene, at least at their tape-contacting peripheries, so as to obviate any possibility that the adhesive underside of the tape 19' will adhere to the feeding mechanism. As is shown in FIG. 3, plate 13 is formed with a slot 45 through which the tape is fed so that its nonadhesive top surface engages the roller 34 which is convex in axial cross-section or barrel-shaped so as to impart a transverse curvature to the tape fed between it and the wheels 43 (see FIG. 4). The roller 34 is bracketed between two disks 46', 46", keyed to shaft 38, whose axial spacing on this shaft is slightly less than the width of the tape passed therebetween so that the aforementioned transverse curvature is maintained even after the tape leaves this roller. We have found that this transverse curvature stiffens the tape sufficiently so as to dispense with the need for any supporting means for the tape between the feeding mechanism and the cutter other than the wheels 44. A bed 47, also preferably coated with a layer 47' of polytetrafluoroethylene or the like, is nevertheless interposed between the cutter and the feeding mechanism to form an auxiliary sliding surface in the event that the curvature of the tape is insufficient to stiffen it and maintain it in its cantilevered condition. Bed 47, which contacts the convex underside of the curved tape only along its median line, is flanked by a pair of sidewalls 96 in line with the disks 46', 46" to confine the edges of the tape.

The head 25 (FIG. 1) also carries a plunger 48 whose lowermost inner cutting edge 49 co-operates with the edge 50 of an anvil portion of bed 47 to sever strips of tape from the band thereof as the latter is advanced past the edge 50. Both the lower plunger surface, which presses the tape against a substrate, and the upper face of the anvil portion in the region of edge 50, are provided with polytetrafluoroethylene coatings 49', 50' somewhat recessed from the edges 49, 50 to prevent adherence of the strip to the plunger 48 or the bed. We have found that, while the band of tape from which a strip has been severed tends to adhere slightly to the bed along the anvil portion, the resilience of this band stiffened by virtue of the transverse curvature thereof is such that the band springs out of engagement with edge 50 after having been but briefly flattened against that edge by the descending cutting edge 49. A pair of springs 51', 51" (FIG. 2) interconnect the cylinder 23 and the head 25 so that the piston 24 descends against the restoring force of these springs.

A conveyor belt 60 carries the substrate 61, to which the adhesive strips are to be applied, past the strip-dispensing device 10 and another device 10', similar to the machine 10 in all respects, only part of which is shown. Conveyor belt 60 passes over a pair of rollers, one of which is shown at 62, and carries the substrate 61 from its supply roll 63 (FIG. 3) past a blade 64 extending transversely of the direction of travel of the band 60 to heat-seal juxtaposed layers of the substrate, which in this case may be a polyethylene sheet folded in generally tubular form (FIG. 6). Blade 64 is provided with resistance heating means, shown schematically as a resistor 65 in circuit with an electric power source 66, and is mounted at the ends of a pair of pistons 67 (one shown) which are reciprocable within cylinder 68. Conveyor roller 62 is provided with an escapement mechanism including a ratchet wheel 69 rigid with its shaft and a pneumatic cylinder 70 whose piston 71 carries a pawl 72 engageable with the ratchet wheel 69 for advancing the substrate 61 on the conveyor belt 60. A spring-loaded roller 73 holds the tubular polyethylene substrate against the conveyor belt.

The apparatus is controlled by a distributing valve 74 which receives fluid under pressure from a pump 75 via an inlet conduit 76. An outlet conduit 77 of this valve is open to the atmosphere. A solenoid 78 is coupled with the valve for selectively interconnecting the inlet conduit 76 with the power branches 79 and 80 of this valve. In one operative position of the valve pressure fluid is fed via branch 79 to the conduits 79a, 79b and 79c connected to the cylinders 23, 68 and 70 rearwardly of their pistons while the branch 80, connected to the return conduits 80a, 80b and 80c of these cylinders, communicates via conduit 77 with the atmosphere. In the other position of the valve branch 80 is connected with the source 75 of fluid under pressure while branch 79 communicates with the atmosphere. Solenoid 78 is operated by a cam 81, continuously driven by a motor 82 to actuate a reversing switch 83 connected in circuit with the solenoid 78 and a battery 84. Thus, the solenoid 78 is periodically reversed to actuate each of the cylinders, thereby causing the advance of the conveyor belt 60 with its substrate and, shortly thereafter, the heat-sealing of the substrate by blade 64 along transverse zones 85 and application of a strip of adhesive to a selected portion of the substrate.

A preferred type of substrate consists of a flattened tubular band of plastic sheet material, e.g. polyethylene, which has been longitudinally slitted to form two transversely spaced upper layers overlying a common lower layer integral therewith along the outer longitudinal edges of the band, the width of each upper layer equaling the depth of a bag to be produced from the band.

As will be apparent from FIG. 6 of the drawing, the folded polyethylene sheet, which constitutes the substrate 61, has two upper layer 61a and 61b integral with a lower layer 61c whose width slightly exceeds the combined width of the upper layers 61a and 61b so that the latter have their proximal edges spaced from the centerline of the sheet to expose a central strip 61d of the lower layer 61c. The heated blade 64 seals the upper layers 61a and 61b to the lower layer 61c along seam 85 and, as shown, may have a cutting edge 64' to sever a two-bag unit 86, intermediate two seams 85, from the remainder of the sheet by scoring or bisecting the seams in the direction of their length along a line 85'. The adhesive strips 87, cut from the tape 19' and applied to the bag pairs along the central strip 61d, advantageously are of the double-adhesive type having each a foil 87a whose upper coating 87b of pressure-sensitive adhesive is masked by a removable strip 87c while the lower coating 87d of this adhesive serves to secure the foil to the bags. Upon detachment of the bags of each pair from each other by cutting along the centerline of the sheet 61 designated by the reference numeral 88, a bag 90 (FIG. 7) is formed whose flap 91 may be secured to a support 92, e.g. an automobile dashboard, by means of the adhesive-tape strip 87. The latter can also be used to hold the bag closed after filling for its disposal, storage etc.

Rotation of cam 81 in the counterclockwise direction will initially urge the armature 83a of switch 83 upwardly to energize the solenoid 78 by way of switch contacts 83b and 83c, thereby actuating the valve 74 to supply fluid under pressure from compressor 75 to the fluid output branch 79. The conveyor-displacement cylinder 70 is thus actuated to advance the substrate conveyor belt 60 and the substrate 61 thereon while cylinder 23 is actuated to initiate the downward or working stroke of tape-dispenser head 25, thereby moving the tape 19′ past the cutting edges 49, 50. Upon further advance of the piston 71 its pawl 72 disengages itself from the ratchet 69, thereby halting the displacement of the conveyor belt 60 while the plunger 48 continues its stroke to sever a strip 87 from the tape 19′ and apply it to the substrate as previously described. The face 49′ of plunger 48 presses the strip of pressure-sensitive tape against the substrate which, in the region of the plunger, is additionally supported by a table 93 carried by a support 94 upon which the tape-dispensing devices 10, 10′ are mounted. Another table 95 supports the conveyor belt 60 in the region of the blade 64 which acts simultaneously with the plunger 48 to seal the seams 85. Continued rotation of cam 81 reverses the solenoid 78 by way of the contacts 83d and 83e to elevate the head 25 and the blade 64 and to retract the piston 71 prior to repetition of the cycle.

The escapement mechanism for intermittently advancing the conveyor 60 may be replaced with a continuous drive, e.g. an electric motor, without disadvantage since the blade 64 need be in engagement with the substrate only momentarily. In this case, however, we prefer to provide the plunger 48 with an extended contact surface such as that of a pressure foot 95, advantageously equipped with one or more downwardly projecting rollers 95′, which maintains pressure upon each newly applied strip of tape as the substrate is displaced therepast; for this purpose the shoe 95 extends laterally from the point of severance, defined by the edges 49, 50, in the direction of conveyor motion.

In FIG. 5 of the drawing we show a modified form 100 of the tape-dispensing device 10 or 10′. The tape 119′ is advanced by a pawl-and-ratchet mechanism 129, 133 in the manner previously described. In the present instance, the means (i.e. the disks 46′ and 46″ and the lateral walls 96 bracketing the bed 47) for forming and maintaining the aforementioned transverse curvature of the tape are dispensed with and, in place thereof, the bed 147, coated with a polytetrafluoroethylene layer 147′, is provided with a ledge 147a. This ledge 147a is formed with a transverse row of air-outlet bores 147b connected to a conduit 147c fed continuously from a source of fluid pressure, e.g. directly from the compressor 75. The air flow emanating from the bores 147b and designated by the arrows 197 forms a cushion supporting the tape 119′. A transverse bar 190, also coated with polytetrafluoroethylene, prevents fluttering of the tape 119′ under the action of the air stream; a similar bar 90 adjacent the plunger 48 prevents the latter from entraining the tape on its upstroke.

The head 125 which, with its plunger 148, is similar to the head 25 of the device 10 and functions in an identical manner; this head carries a rod 198 adapted to engage the tape in the course of the downstroke of the head 125 but subsequently to the severing of a strip therefrom to withdraw the uncut tape portion from engagement with the cutting edge 150 of the bed 147. Antiadhesion pads 149′, 150′ on the faces of plunger 148 and anvil 150a, recessed from cutting edge 149 and co-operating edge 150, further insure rapid disengagement of the tape from these edges.

FIGS. 8 and 9 illustrate a portable, manually operable tape-dispensing device 200 generally similar to the tape-dispensing device 10 previously described. The device 200 has the configuration of a gun with a handle 298 and a hollow barrel 299. The latter carries a pair of depending arms 214 of spring steel between which a roll 219 of tape and a shaft 214 for same may be inserted by slightly spreading the arms. Tape 219′ feeds from the supply roll 219 over a barrel-shaped roller 234 in contact with a polytetrafluoroethylene-toothed wheel 243. As may be seen in FIG. 9, a transverse curvature, upwardly concave, is imparted to the tape 219′ by the disks 246′ and 246″ bracketing the roller 234 and axially spaced by a distance slightly less than the width of the tape. The tape is thus fed through a channel 247 whose lateral walls (one of which is shown at 296) are coplanar with the inner face of the disks 246′ and 246″ and thus maintain the curvature of the tape.

A trigger 274 is pivoted to the barrel 299 at 211 and carries a spring-loaded finger 279 adapted to engage a pin 280 on a rack 225 and to displace it to the right upon rotation of the trigger 274 in the clockwise sense against the restoring action of a spring 252. Rack 225 rotates a pinion 225′ to drive a further rack 225″ to the left (FIG. 8). Rack 225″ draws a plunger 248 back against the force of a spring 300 so that, upon finger 279 clearing the pin 280, the racks are decoupled from the trigger 274 and the spring 300 drives the plunger to sever a strip of tape and to apply it to any substrate against which the frontal surface 301 of the barrel is being held. As trigger 274 displaces the rack 225 to the right, however, and in the course of the opposite displacement of rack 225″, a pawl 229 steps a ratchet 233 which rotates, via a bevel-gear transmission 239 and a worm transmission 240, the feed roller 234 and, together therewith, the toothed wheel 243 via the further bevel-gear transmissions 302, 303. Thus, during the rearward displacement of the plunger 248, a strip of tape 219′ of predetermined length is fed past the anvil edge 250 in the manner previously described. An adjustable cam 231 with a ramp 232 serves to disengage the pawl 229 from the ratchet 233 so that its position determines the width of the strip applied by the device as mentioned above with reference to cam 31. Plunger 248 and anvil 250a again carry anti-bonding pads 249′, 250′ recessed from their respective edges 249, 250.

The invention described in the foregoing is believed to admit of many modifications and variations within the ability of persons skilled in the art, including combinations of compatible features from different embodiments, all such modifications and variations being deemed included within the spirit and scope of the invention claimed.

We claim:

1. A tape dispenser comprising a base, support means on said base for carrying a roll of tape to be dispensed, feed means on said base for drawing tape from said roll, and plunger means reciprocably displaceable on said base and operatively coupled with said feed means for applying a strip of tape advanced by said feed means past said plunger means to a substrate, said plunger means being formed with a cutting edge extending transversely of said tape for severing said strip therefrom prior to its application to said substrate, said feed means including a first roller journaled on said base for rotation about an axis extending transversely of said tape in engagement with a non-adhesive surface thereof, a second roller rotatable about another axis extending transversely of said tape in engagement with an adhesive surface thereof, drive means for intermittently unidirectionally rotating at least one of said rollers, and tape-engaging means including said feed roller for imparting a transverse curvature to a portion of tape advanced past said cutting edge, said tape-engaging means including a pair of disks axially spaced by a distance less than the width of said tape and bracketing said feed roller while being rotatable therewith, said disks forming confining surfaces engaging the edges of said tape.

2. A tape dispenser according to claim 1 wherein said drive means includes a ratchet wheel operatively coupled with said one roller, a pawl engageable with said ratchet wheel for stepping same, a reciprocably displaceable member ganged with said plunger means and articulated to said pawl, and cam means for disengaging said pawl from said ratchet wheel after a predetermined stroke of said member for inactivating said feed means.

3. A tape dispenser according to claim 1, for use with a substrate conveyor movable in a direction parallel to said axis, wherein said plunger means is provided with a tape-engaging face extending laterally beyond the path of said tape in the direction of conveyor motion.

4. A tape dispenser according to claim 1 wherein said feed roller is generally barrel-shaped and is smoothly convex intermediate said disks.

5. A tape dispenser according to claim 1, further comprising a bed intermediate said feed roller and said cutting edge juxtaposed with said adhesive surface of said tape, and means for preventing contact between said bed and said adhesive surface.

6. A tape dispenser according to claim 5 wherein said bed is provided with a coating of a material substantially non-adherent to said adhesive surface.

7. A tape dispenser according to claim 6 wherein said material is a polytetrafluoroethylene layer.

8. In a dispenser for a tape having an adhesive and a non-adhesive surface, in combination, supply means for a length of said tape, feed means for directing said tape from said supply means along a substantially straight path to a severance point, plunger means reciprocable across said path at said severance point, said plunger means being normally withdrawn into a position facing said non-adhesive surface and being provided with a tape-engaging face having a cutting edge for detaching a generally rectangular strip portion from said tape and driving said portion with its adhesive surface against a substrate, anvil means at said severance point positioned to support said adhesive surface and provided with a tape-engaging face having an edge co-operating with said cutting edge, and a layer of a material nonadherent to said adhesive surface carried by each of said tape-engaging faces with slight spacing from said edge thereof, said feed means comprising a roller with a convex surface spanning the entire width of said tape and engageable with said non-adhesive surface, said tape-guiding means further comprising a pair of disks flanking said roller and a common drive shaft for said roller and said disks, said disks being axially spaced by a distance less than the width of said tape and being engageable therewith.

9. The combination according to claim 8 wherein said feed means comprises tape-guiding means forming a channel for said tape of lesser width than the latter whereby said tape is given a transverse curvature convex toward said anvil means.

10. A tape dispenser comprising a base, support means on said base for carrying a roll of tape to be dispensed, feed means on said base for drawing tape from said roll, and plunger means reciprocably displaceable on said base and operatively coupled with said feed means for applying a strip of tape advanced by said feed means past said plunger means to a substrate, said plunger means being formed with a cutting edge extending transversely of said tape for severing said strip therefrom prior to its application to said substrate, said feed means including a first roller journaled on said base for rotation about an axis extending transversely of said tape in engagement with a non-adhesive surface thereof, a second roller rotatable about another axis extending transversely of said tape in engagement with an adhesive surface thereof, drive means for intermittently unidirectionally rotating at least one of said rollers, said dispenser further comprising a bed intermediate said feed roller and said cutting edge juxtaposed with said adhesive surface of said tape, and means for preventing contact between said bed and said adhesive surface, said bed being provided with a plurality of fluid-outlet ports, and means for supplying said ports with a substantially continuous flow of fluid, thereby establishing a fluid cushion between said bed and said adhesive surface.

References Cited in the file of this patent

UNITED STATES PATENTS

| | | |
|---|---|---|
| 2,228,372 | Skrebba | Jan. 14, 1941 |
| 2,444,685 | Waters | July 6, 1948 |
| 2,634,877 | Kaplan | Apr. 14, 1953 |
| 2,656,063 | Kafka | Oct. 20, 1953 |
| 2,757,584 | Clemente | Aug. 7, 1956 |
| 2,758,517 | Brightwell | Aug. 14, 1956 |
| 2,864,428 | White | Dec. 16, 1958 |